(12) United States Patent
Townsend et al.

(10) Patent No.: US 10,775,404 B2
(45) Date of Patent: Sep. 15, 2020

(54) ACCELEROMETERS

(71) Applicant: Atlantic Inertial Systems Limited, Plymouth, Devon (GB)

(72) Inventors: Kevin Townsend, Liskeard (GB); Michael Durston, Plymouth (GB); Douglas Sitch, Plymouth (GB)

(73) Assignee: ATLANTIC INERTIAL SYSTEMS, LIMITED, Plymouth, Devon (GB)

( * ) Notice: Subject to any disclaimer, the term of this patent is extended or adjusted under 35 U.S.C. 154(b) by 21 days.

(21) Appl. No.: 15/321,838

(22) PCT Filed: Jun. 26, 2015

(86) PCT No.: PCT/GB2015/051881
§ 371 (c)(1),
(2) Date: Dec. 23, 2016

(87) PCT Pub. No.: WO2015/198075
PCT Pub. Date: Dec. 30, 2015

(65) Prior Publication Data
US 2017/0153267 A1    Jun. 1, 2017

(30) Foreign Application Priority Data
Jun. 27, 2014    (GB) .................................. 1411484.7

(51) Int. Cl.
*G01P 15/13* (2006.01)
*G01P 15/125* (2006.01)
*G01P 15/08* (2006.01)

(52) U.S. Cl.
CPC .......... *G01P 15/131* (2013.01); *G01P 15/125* (2013.01); *G01P 15/13* (2013.01); *G01P 2015/0814* (2013.01)

(58) Field of Classification Search
None
See application file for complete search history.

(56) References Cited

U.S. PATENT DOCUMENTS 5,563,343 A    10/1996  Shaw et al.
5,583,290 A *  12/1996  Lewis .................. G01P 15/125
                                                        73/514.18

(Continued)

FOREIGN PATENT DOCUMENTS

DE    2814794 A1    10/1979
EP    2746780 A1     6/2014

(Continued)

OTHER PUBLICATIONS

GB Search Report for Application No. PCT/GB2015/051881; dated Dec. 4, 2015; 4 pages.

(Continued)

*Primary Examiner* — Jill E Culler
*Assistant Examiner* — Ruben C Parco, Jr.
(74) *Attorney, Agent, or Firm* — Cantor Colburn LLP

(57) ABSTRACT

A method for closed loop operation of a capacitive accelerometer uses a single current source (62) and a single current sink (64) to apply an in-phase drive signal $V_1'$ to a first set of fixed capacitive electrode fingers and a corresponding anti-phase drive signal $V_2'$ to a second set of fixed capacitive electrode fingers. This provides a net electrostatic restoring force on the proof mass for balancing the inertial force of the applied acceleration and maintains the proof mass at a null position.

20 Claims, 5 Drawing Sheets

(56) References Cited

U.S. PATENT DOCUMENTS

| | | | |
|---|---|---|---|
| 5,812,427 A | | 9/1998 | Nonoyama et al. |
| 5,817,942 A | | 10/1998 | Greiff |
| 2010/0116054 A1* | | 5/2010 | Paulson ................ G01P 15/125 |
| | | | 73/514.32 |
| 2012/0188214 A1 | | 7/2012 | Hosokawa et al. |

FOREIGN PATENT DOCUMENTS

| | | | |
|---|---|---|---|
| JP | S54131974 A | 10/1979 | |
| JP | H11118827 A | 4/1999 | |
| WO | 928427 A1 | 12/1994 | |
| WO | 0116606 A1 | 3/2001 | |
| WO | 0151931 A2 | 7/2001 | |
| WO | 2004076340 A1 | 9/2004 | |
| WO | 2005083451 A1 | 9/2005 | |
| WO | 2013050752 A1 | 4/2013 | |
| WO | 2015198075 A1 | 12/2015 | |

OTHER PUBLICATIONS

International Preliminary Report on Patentability Application No. PCT/GB2015/051881; dated Jun. 16, 2016; 12 pages.
International Search Report and the Written Opinion of the International Searching Authority, or the Declaration; PCT/GB2015/051881; dated Sep. 4, 2015; 12 pages.
JP Office Action for Patent Application 2016-570010, dated Sep. 4, 2018, 2 pages.

* cited by examiner

ACCELEROMETERS

CROSS REFERENCE TO RELATED APPLICATIONS

This is a US National Stage of Application No. PCT/GB2015/051881, filed on Jun. 26, 2015, which claims the benefit of GB Application No. 1411484.7, filed Jun. 27, 2014, the disclosures of which are incorporated herein by reference.

TECHNICAL FIELD

The present disclosure relates to capacitive accelerometers, and in particular to methods for closed loop operation of a capacitive accelerometer.

BACKGROUND

Accelerometers are electromechanical devices that are widely used to measure acceleration forces due to motion and/or vibration. Capacitive accelerometers may find use in applications including seismic sensing, vibration sensing, inertial sensing and tilt sensing. Capacitive accelerometers are typically implemented as micro electromechanical systems (MEMS) and may be manufactured from a semiconductor material such as silicon. A typical MEMS sensing structure for a capacitive accelerometer comprises a proof mass moveably mounted to a support, with a set of electrode fingers extending from the proof mass being interdigitated with one or more sets of fixed electrode fingers so as to form a differential capacitor. WO 2004/076340 and WO 2005/083451 provide examples of capacitive accelerometers comprising a plurality of interdigitated fixed and moveable electrode fingers extending substantially perpendicular to the sensing direction of the MEMS device. The electrodes of the sensing structure are connected to suitable drive and pickoff electronics, typically in an application-specific integrated circuit (ASIC).

In an open loop accelerometer the electronics are arranged to drive the fixed electrodes with a sine or square wave signal and the proof mass moves under acceleration to provide a pickoff signal that is a rectified voltage appearing on the output. WO 2004/076340 provides an example of an open loop accelerometer. However, open loop accelerometers can have limited performance in terms of bandwidth, linearity and dynamic range.

In an open loop configuration the main requirement for the drive waveforms to ensure accuracy is that the drives reach the same amplitude and have sufficient settling time prior to the pickoff sampling. Variations in the transitions between the two drives do not affect the performance of an open loop sensor as long as there is sufficient settling time, where the mark:space ratio of the drive signal waveform is typically fixed at 50:50 and therefore provides a large time window for settling.

An accelerometer sensing structure designed for open loop operation can also be used in a closed loop configuration by using drive electronics to provide a variable electrostatic force to the electrodes to achieve force rebalancing. WO 2005/083451 provides an example of a closed loop electronic control circuit using pulse width modulation (PWM) of the drive signals. In such a closed loop configuration, the electronics are arranged to drive pairs of the fixed electrode fingers in-phase and anti-phase using PWM signals so that the proof mass is fixed in position by virtue of the electrostatic forces nulling the inertial force due to acceleration. The mark:space ratio of the PWM drive signals can be adjusted to produce a variable rebalance force. Feedback from a pickoff circuit to the PWM drive signal generator causes the length of each PWM pulse to be changed as a function of the pickoff output voltage so as to provide an average electrostatic restoring force maintaining the proof mass at a central null position. In a closed loop configuration, the drive waveform symmetry becomes more important for performance than in open loop operation as the drive signals now provides a measure of the applied acceleration as well as providing the excitation for the pickoff sensor.

In a closed loop configuration, the net value of the rebalancing force is proportional to the applied acceleration. When an electrostatic force transducer is used, the force is proportional to the square of the voltage, such that in a PWM scheme as discussed above, the average force is proportional to the square of the PWM drive signal. This assumes that the amplitude of the PWM voltages is constant at the peak of the drive waveform, and that the acceleration is proportional to the mark:space ratio of the signal. However, in a system such as this there is a ramp time to achieve constant voltages. The ramp time can be characterised by the slew rate, which is the maximum change in voltage per unit time.

The ramp time of the drive voltages can cause errors to be introduced. Having a very short ramp time, while desirable, is impractical, as it requires a high instantaneous current during the ramping phase. However, using a finite ramp time requires the in-phase and anti-phase drive signals to be very well matched. This is because the electrostatic force produced by each transducer varies as a $V^2$ function relative to the pickoff electrode DC voltage, and therefore variations during the ramping phase will change the average DC electrostatic force, so any mismatch would cause a resultant electrostatic force on the proof mass (which is not due to an applied acceleration).

The use of equal but opposite PWM drive signals results in a net balancing force that is directly proportional to the average value of each drive signal. While the electrostatic forces vary as $V^2$, for a fixed drive voltage amplitude the applied restoring force in a PWM scheme is proportional to the average voltage for each drive, as the squared dependency is removed by the use of in-phase and anti-phase drive signals. This equality allows any non-linear terms in the drive signals to be cancelled. Usually, two separate current sources and sinks are used in the driver circuit to produce the respective in-phase and anti-phase signals simultaneously. However, if the in-phase and anti-phase drive signals are not equal and opposite, the non-linear terms will not cancel accurately, causing bias, scale factor and linearity errors. The reference voltage for the PWM signals is therefore critical, as the measurements are taken relative to this reference.

In addition, the PWM drive signals are used to produce pickoff position sensing. The accelerometer output is an AC signal superimposed on a DC offset or bias voltage. In open loop accelerometers and in conventional closed loop accelerometers, the DC offset voltage input to the pickoff amplifier is typically biased mid way between the supply voltage rails to minimise any unwanted electrostatic forces being applied to the proof mass and to allow deviations during the transition period of the drive waveforms. This reduces or eliminates the range of electrostatic force available for rebalancing in closed loop, therefore limiting the dynamic range of the acceleration measurements. This pickoff input DC bias voltage is required to be very stable to ensure no additional errors are introduced. Conventional closed loop and open loop accelerometers try to avoid any net forces being applied to the proof mass by reducing the drive voltage, making it as small as possible in order to reduce the sensitivity of the system to the DC offset of the drive and pickoff signals. For a closed loop PWM based accelerometer, it is therefore advantageous to have the pickoff DC input bias operating at the lower supply rail, at 0V for unipolar electronics such as standard CMOS ASIC processes, to maximise the available rebalancing force.

The present disclosure seeks to reduce or overcome the disadvantages outlined above in relation to driving methods for a closed loop accelerometer.

SUMMARY

According to a first aspect of this disclosure there is provided a method for closed loop operation of a capacitive accelerometer, the capacitive accelerometer comprising:
- a substantially planar proof mass mounted to a fixed substrate by flexible support legs so as to be linearly moveable in an in-plane sensing direction in response to an applied acceleration;
- first and second sets of moveable capacitive electrode fingers extending from the proof mass, substantially perpendicular to the sensing direction and spaced apart in the sensing direction; and
- first and second sets of fixed capacitive electrode fingers extending substantially perpendicular to the sensing direction and spaced apart in the sensing direction;
- wherein the first set of fixed capacitive electrode fingers is arranged to interdigitate with the first set of moveable capacitive electrode fingers and the second set of fixed capacitive electrode fingers is arranged to interdigitate with the second set of moveable capacitive electrode fingers;

the method comprising:
using a single current source and sink to apply an in-phase drive signal to the first set of fixed capacitive electrode fingers and a corresponding anti-phase drive signal to the second set of fixed capacitive electrode fingers so as to provide a net electrostatic restoring force on the proof mass for balancing the inertial force of the applied acceleration and maintaining the proof mass at a null position.

Thus a method is provided which stabilises the simultaneous rise and fall of the drive signals applied in a closed loop accelerometer in order to reduce signal mismatch. It will be appreciated that the drive signals are typically voltage waveforms. Although voltage signals are applied to the capacitive electrode fingers, the drive circuit is controlled using the current source. This approach is particularly suitable for a semiconductor structure built on a CMOS ASIC chip.

According to this disclosure, a single current source and sink is used to provide the in-phase and anti-phase drive signals to both the first and second sets of fixed electrode fingers. This reduces the errors found to be introduced by the use of two separate current sources and two separate current sinks for each drive waveform, where a mismatch between the current drives can result in the rising/falling slew rate of the two drive waveforms being different. This then causes an asymmetry in the drive waveforms, which in turn creates a bias error and transients in the pickoff sensing signals. However, by using a single current source for both in-phase and anti-phase drive signals, there is no introduction of bias due to current source mismatch. The current source and sink can be arranged to be substantially equal.

In closed loop operation, the drive signals act to restore the moveable electrode fingers of the proof mass to the null position. However, under variable acceleration the proof mass will initially be deflected before the electrostatic restoring forces begin to act, causing the interdigitation between the fixed and moveable electrode fingers to change. This causes a mismatch in the capacitance seen by the in-phase and anti-phase drive signals, as the interdigitation gaps are no longer equal for the first and second sets of fingers. Under these conditions with a constant current drive, the ramping transition would be different for the two drive waveforms. This mismatch in the slew rates (which measure the change in voltage per unit time) creates a disturbance on the pickoff input and contributes an error to the electrostatic restoring force. This disturbance on the pickoff input is proportional to the difference between the slew rates for the in-phase and anti-phase drive signals. The error created by the mismatch in the slew rates due to the difference in load seen by the driver circuit is therefore proportional to the level of the applied acceleration (or vibration) and is present until the proof mass has been returned to its null position.

According to an example of the present disclosure the method further comprises: using a control signal to adjust the drive signal applied to at least one of the first and second sets of fixed capacitive fingers by the single current source and sink, such that a first slew rate of the drive signal applied to the first set of capacitive fingers is substantially equal to a second slew rate of the drive signal applied to the second set of capacitive fingers. The first slew rate relates to the in-phase drive signal, and the second slew rate relates to the anti-phase drive signal, so that the in-phase and anti-phase drive signals are matched in slew rate. The first and second slew rates may be determined at a rising of the in-phase drive signal or at a falling of the in-phase drive signal (and corresponding anti-phase drive signal). In one example, the first and second slew rates are substantially equal at both a rising and a falling of the in-phase drive signal (and corresponding anti-phase drive signal).

The drive signal may be adjusted for only one of the first and second sets of fixed capacitive fingers, but in one example the method comprises using a control signal to adjust the drive signal applied to both the first and second sets of fixed capacitive fingers by the single current source and sink, such that a first slew rate of the drive signal applied to the first set of capacitive fingers is substantially equal to a second slew rate of the drive signal applied to the second set of capacitive fingers. The control signal may be generated by any suitable electronics. In one set of examples, the method comprises: determining an average amplitude of the in-phase and anti-phase drive signals and comparing the average amplitude to a reference value to generate the control signal.

According to such further features of the method, it is ensured that the drive waveforms are symmetrical by matching the slew rates (which measure a maximum change in amplitude per unit time) during the transition periods when the drive signals are rising or falling between cycles. For example, the first slew rate may represent a rising voltage signal which is matched to the second slew rate of a falling voltage signal, or vice versa. The average amplitude may be an average voltage that is compared to a reference voltage. This comparison may create an error signal which is then used to control the current sources to make the drive signals equal. Such an approach can significantly reduce the disturbances on the pickoff input, which are exacerbated during changes in applied acceleration, due to the mismatch otherwise seen in the load capacitance by the drive signals.

It has been found that a mismatch of greater than 1 part in 1000 between the first and second slew rates of the drive signals can cause an undesirable bias. Accordingly the drive signal applied to one of the first and second sets of fixed capacitive fingers by the single current source and sink may be adjusted such that the first and second slew rates are equal to 1 part in 1000 or better.

The disclosed methods of slew rate matching have been found to ensure good bias accuracy for capacitive accelerometers. For example, for PWM drive signals having a cycle time of 20 microseconds and a typical rise time of 800 ns, the rise/fall time can be stabilised to within 1 ns. This makes it possible to achieve a stability of bias better than 1 mg. This can be compared to a typical bias of around 10 mg in a conventional accelerometer without slew rate matching.

In various examples, the single current source and sink that applies both the in-phase and anti-phase drive signals may comprise a single variable or adjustable current source and sink. The control signal may therefore be applied directly to the single current source and sink. However, it may be desirable that the single current source and sink comprises a fixed current source and sink so that the drive signals always have an accurate amplitude, with the control signal being applied to a secondary, variable or adjustable current source and sink connected in parallel so that the drive signals can be varied to allow for increased matching between the in-phase and anti-phase drive signals. The variable or adjustable current source and sink (secondary) may apply a smaller current than the single fixed current source and sink (primary). By providing a majority of the drive current from a single fixed current source and sink, then controlling the secondary variable current source and sink to adjust a small proportion of the fixed current level, there is higher accuracy of control and better slew rate matching.

When the voltage signals can be very accurately defined, the current drives can be connected rail to rail (e.g. between maximum and minimum available voltages) to maximise the measurement range of the accelerometer. As the scale factor of the accelerometer is proportional to voltage squared, this improves scale factor accuracy. It may therefore be desirable to apply the control signal indirectly to the secondary variable current source and sink so as to achieve current (and hence voltage) steering primarily using the fixed current source and sink but with a small proportion of the fixed level adjusted with a high degree of control.

Thus according to examples of the present disclosure the method further comprises: applying the control signal to a variable current source and sink connected in parallel with the single current source and sink so as to adjust the drive signal applied to one of the first and second sets of fixed capacitive fingers, The single current source and sink are optionally fixed. In such examples at least one variable current source and sink (secondary) is provided in addition to the single current source and sink (primary). The variable current source and sink is used to adjust the amplitude of one or both of the drive signals, in order to alter the first and/or second slew rates so that the first and second drive signals substantially match. Reducing the mismatch between the two drive waveforms in this way has been found to suppress bias and scale factor errors under various applied accelerations.

As well as ensuring the stability and matching of the drive signal waveforms, it has been recognised that the disclosed methods enable any overshoot on the pickoff input to be avoided. The pickoff amplifier input no longer has to be biased away from the low voltage supply rail e.g. 0V to allow deviations during the waveform transition period. Rather, according to examples of the present disclosure, the method may further comprise: measuring a pickoff signal from the proof mass (e.g. corresponding to displacement of the proof mass from the null position) and comparing the amplitude of the pickoff signal to a reference value that is substantially zero. For example, the pickoff signal voltage may be compared to a 0V reference rather than a precision voltage reference value. Using 0V as the reference value for the pickoff amplifier means that the maximum voltage range (e.g. 0V to $+V_{dd}$) can be used for the drive signal voltages to maximise the dynamic range of the accelerometer measurements.

Typically the pickoff signal is input to a pickoff amplifier using one or more ESD diodes for protection from electrostatic discharge. When the pickoff input is biased with reference to 0V, any voltage disturbance (e.g. greater than 200 mV) can cause the ESD diode(s) to conduct. The resulting charge transfer means that the pickoff signal becomes incorrect, resulting in additional bias or scale factor errors. However, such issues are avoided when the drive signals are matched as disturbances on the pickoff input are significantly reduced. Accordingly the various features of the methods disclosed herein can be combined in an advantageous manner.

As mentioned above, the amplitude of the drive signals determines the dynamic range of the accelerometer. In examples of the present disclosure the single current source and sink may apply drives having an amplitude $V_{dd}$ of at least 25 V and up to about 35 V, in order to provide the electrostatic restoring forces required to achieve a dynamic range of at least 50 g and up to 100 g.

The single current source and sink may be connected to the first and second sets of fixed capacitive electrode fingers in any suitable way. Whereas two separate current sources and sinks were previously connected to the fixed electrode fingers to apply the in-phase and anti-phase drive signals simultaneously, the single current source and sink may be connected to the fixed electrode fingers by a switch so as to switch back and forth between the in-phase and anti-phase drive signals. Using a single current source and sink also reduces the cost of the system architecture.

So as to assist in closed loop operation, the in-phase and anti-phase drive signals may be applied as pulse width modulation (PWM) voltage waveforms. Accordingly the length of the PWM pulses, i.e. the mark:space ratio, may be adjusted to vary the electrostatic restoring force on the proof mass. This is described in more detail in WO 2005/083451, the contents of which are hereby incorporated by reference.

The present disclosure also extends to a capacitive accelerometer comprising:
  a substantially planar proof mass mounted to a fixed substrate by flexible support legs so as to be linearly moveable in an in-plane sensing direction in response to an applied acceleration;
  first and second sets of moveable capacitive electrode fingers extending from the proof mass, substantially perpendicular to the sensing direction and spaced apart in the sensing direction;
  first and second sets of fixed capacitive electrode fingers extending substantially perpendicular to the sensing direction and spaced apart in the sensing direction;
  wherein the first set of fixed capacitive electrode fingers is arranged to interdigitate with the first set of moveable capacitive electrode fingers and the second set of fixed capacitive electrode fingers is arranged to interdigitate with the second set of moveable capacitive electrode fingers;

a drive signal generator arranged to apply an in-phase drive signal to the first set of fixed capacitive electrode fingers and a corresponding anti-phase drive signal to the second set of fixed capacitive electrode fingers so as to provide a net electrostatic restoring force on the proof mass for balancing the inertial force of the applied acceleration and maintaining the proof mass at a null position; and a single current source and sink connected to the drive signal generator to generate both the in-phase and anti-phase drive signals.

The in-phase and anti-phase drive signals may comprise pulse width modulation (PWM) voltage waveforms.

In examples of this disclosure the capacitive accelerometer may further comprise a control circuit arranged to adjust the drive signal applied to at least one of the first and second sets of fixed capacitive fingers by the single current source and sink, such that a first slew rate of the drive signal applied to the first set of capacitive fingers is substantially equal to a second slew rate of the drive signal applied to the second set of capacitive fingers. The first slew rate relates to the in-phase drive signal, and the second slew rate relates to the anti-phase drive signal, so that the in-phase and anti-phase drive signals are matched in slew rate. The first and second slew rates may be determined at a rising of the in-phase drive signal or at a falling of the in-phase drive signal (and corresponding anti-phase drive signal). In one example, the first and second slew rates are substantially equal at both a rising and a falling of the in-phase drive signal (and corresponding anti-phase drive signal).

As is discussed above, the control circuit may be arranged to adjust the drive signal applied to both the first and second sets of fixed capacitive fingers by the single current source and sink, such that a first slew rate of the drive signal applied to the first set of capacitive fingers is substantially equal to a second slew rate of the drive signal applied to the second set of capacitive fingers. The control circuit may be arranged to determine an average amplitude of the in-phase and anti-phase drive signals and compare the average amplitude to a reference value.

As is discussed above, it may be desirable that the single current source and sink comprises a fixed current source and sink so that the drive signals always have an accurate amplitude. In examples of this disclosure the control circuit comprises a variable current source and sink (secondary) connected in parallel with the single fixed current source and sink (primary).

In a set of examples, the variable current source and sink provide a smaller current than the single fixed current source and sink, such that an adjustment provided by the variable current source and sink represents a small proportion of the fixed current provided by the fixed current source and sink. A single fixed current source is used to provide a majority of the drive signal (in the form of a drive current), while the secondary variable current source is controlled to adjust the overall drive current, as this provides the best initial matching between the in-phase and the anti-phase signals. This can increase the level of control over the drive signals, and can allow for more accurate matching of the drive signals.

Various of the features disclosed herein enable the accelerometer to have a pickoff signal input biased at 0V, thereby removing the need for an additional highly accurate reference voltage. When the pickoff signal input is biased to the lower rail of the drive voltage supply then sources of error are minimised. Thus, in examples of this disclosure the capacitive accelerometer may further comprise a pickoff signal amplifier connected to the proof mass and arranged to compare the pickoff signal amplitude to a reference value that is substantially zero.

In any of the examples disclosed above, the first set of fixed capacitive electrode fingers may have a first offset in one direction from a median line between the interdigitated electrode fingers and the second set of fixed capacitive electrode fingers may have a second offset in the opposite direction from the median line.

In any examples of this disclosure, the proof mass and the fixed electrode fingers may be integrally formed from a semiconductor substrate, for example a silicon substrate. The capacitive accelerometer may take the form of a MEMS accelerometer.

BRIEF DESCRIPTION OF DRAWINGS

One or more non-limiting examples will now be described with reference to the accompanying drawings, in which:

FIG. 1 provides a schematic overview of closed loop operation of an accelerometer. In a closed loop control configuration, the fixed electrode fingers 110, 112 can be controlled using a pulse width modulation (PWM) technique, in which an in-phase PWM signal $V_1$ is applied to one set of fingers 110, and an anti-phase PWM signal $V_2$ is applied to the other set of fingers 112. A PWM drive signal generator 22 supplies the complementary in-phase and anti-phase drive voltages $V_1$ and $V_2$ to the respective electrode fingers 110, 112. A pickoff voltage signal $V_{out}$ from the proof mass 102 is taken to a pre-amp 23. A demodulator 24 receives and demodulates an output 25 from the pre-amp 23 to provide an output 27 representing the displacement of the proof mass from the null position. An integrator/loop filter 26 receives, integrates and filters the output 27 from the demodulator 24. The resultant feedback signal 28 represents the required restoring force due to the displacement of the proof mass from the null position and is therefore proportional to the applied acceleration. The signal 28 is input to the PWM generator 22 to adjust the mark:space ratio of the PWM drive voltages $V_1$ and $V_2$. The generator 22 is arranged to increase or decrease the mark length of the PWM pulses and thereby change the mark:space ratio to provide the required restoring force on the proof mass. When the proof mass 102 tends to move under the inertial force of an applied acceleration, the PWM voltage signals $V_1$ and $V_2$ applied to the fixed electrodes 110, 112 provide an electrostatic restoring force to null the proof mass 102 and therefore allow an indirect measurement of the acceleration. A differential amplifier 29 with a low pass filter 30 is provided to compare the drive voltages $V_1$ and $V_2$ and provide an output at 31. Alternatively the PWM feedback signal 28 can be used as a direct output representing the applied acceleration, providing the generator 22 has sufficient accuracy.

When using such a PWM approach, the electrostatic restoring force is proportional to the mark:space ratio, which gives a linear output across the sensor's operational range. The size of the restoring force required to maintain the fingers in a fixed position can be used to calculate the force on the proof mass 102, and therefore the applied acceleration along the sensing direction of the accelerometer.

Figure 1:
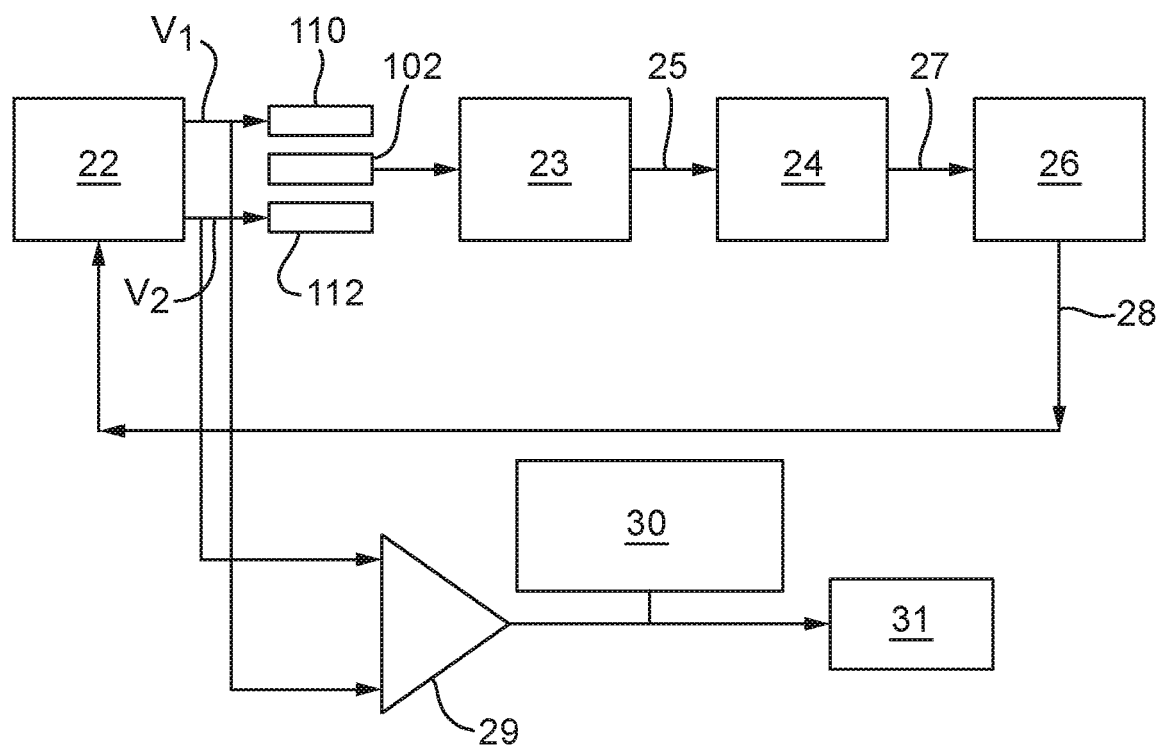
FIG. 1 shows a block diagram of a closed loop electronic control system for an accelerometer.
Figure 2:
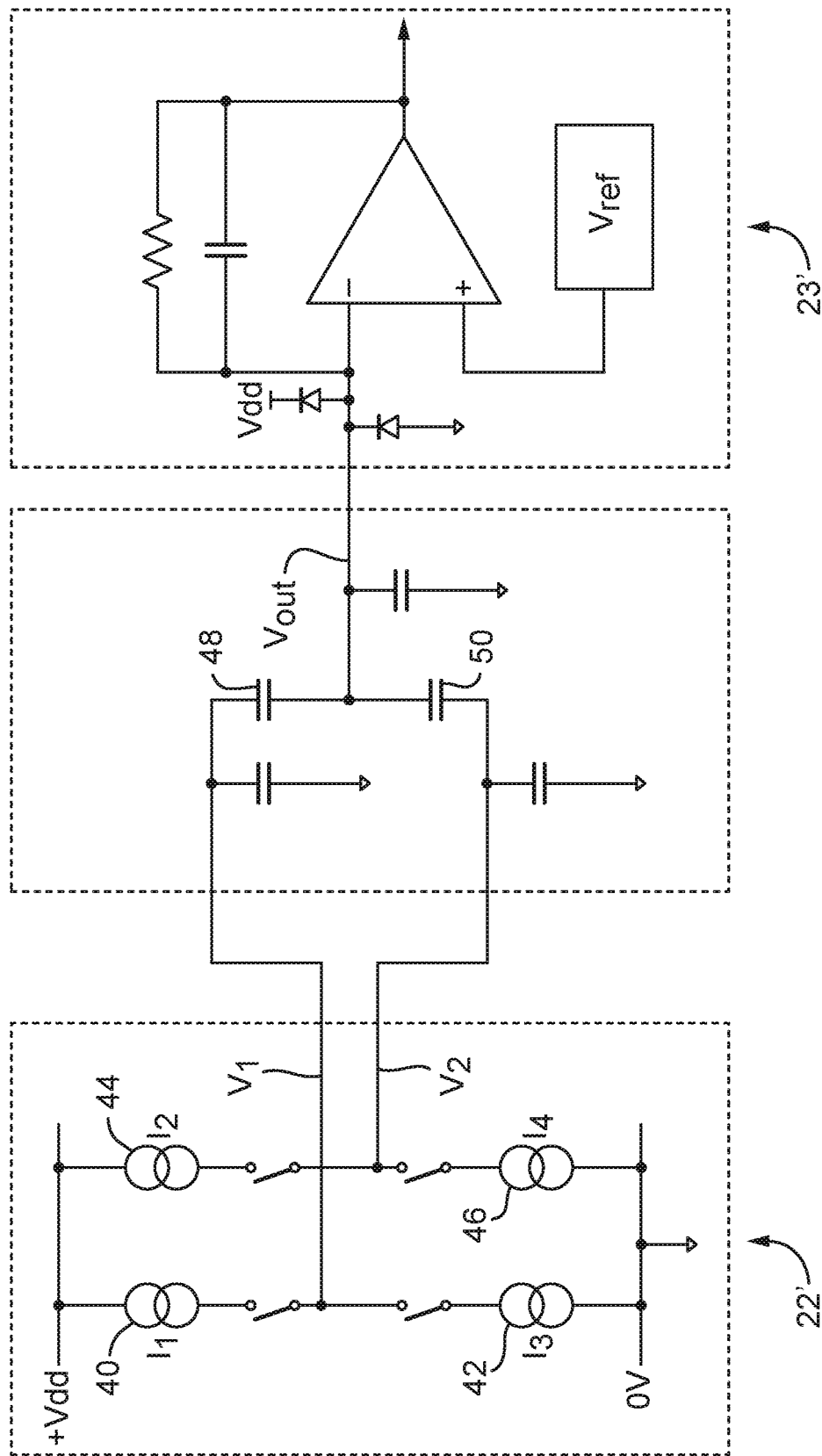
FIG. 2 shows a prior art driving arrangement for use in a closed loop system such as that of FIG. 1.

FIG. 2 shows a prior art driving arrangement which could be used in a system such as that of FIG. 1. The drive signal generator 22' includes two separate current sources 40, 44 and sinks 42, 46. The rise times for the drive waveforms are created using the current sources, and the fall times are created using the current sinks. The fixed electrode fingers 110, 112 and the proof mass 102 form first and second capacitors 48, 50, with an output from the proof mass 102 being connected to a pre-amp 23'.

In use, the two current sources 40, 44 and sinks 42, 46 apply separate currents $I_2$ and sinks $I_3$, $I_4$ to generate in-phase and anti-phase drive signals $V_1$, $V_2$ respectively (shown schematically as 50:50 square waveforms). These simultaneous drive signals $V_1$, $V_2$ are intended to be equal and opposite in amplitude, but due to random device variations there can be a mismatch in the drive signals. The drive signals $V_1$, $V_2$ are PWM voltage signals, with a predetermined mark:space ratio. The first and second capacitors 48, 50 are driven by the in-phase and anti-phase drive signals $V_1$, $V_2$ respectively. Due to the closed loop nature of the system, these drive signals $V_1$, $V_2$ apply electrostatic forces to restore the proof mass 102 to a null position, maintaining the capacitors 48, 50 with a constant separation e.g. between interdigitated electrode fingers. An output voltage $V_{out}$ is taken from the proof mass 102 to a pre-amp 23', which is referenced at a predetermined voltage $V_{ref}$ so as to be biased away from the low voltage supply rail to allow for deviations in the signal. The pre-amp 23' therefore requires a precision voltage reference. An output from the pre-amp 23' can then be demodulated and used as PWM feedback, as explained with reference to FIG. 1.

Figure 3A:
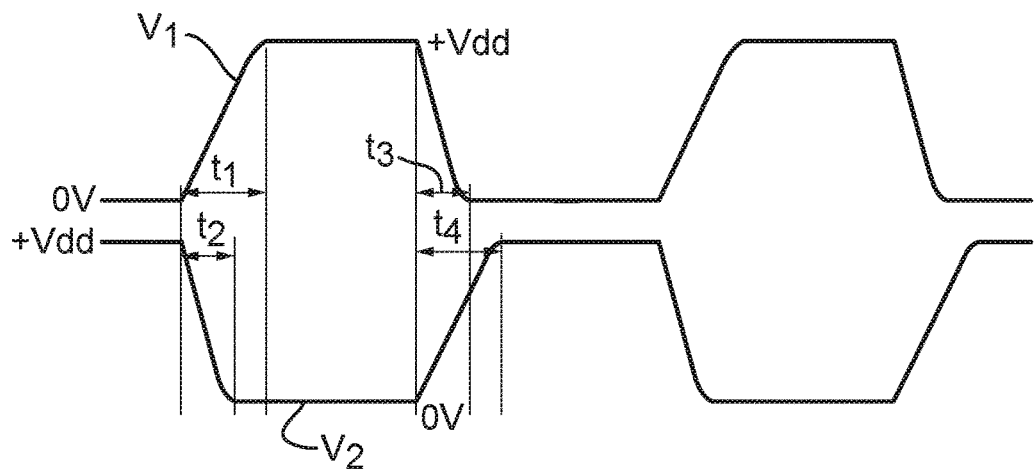
FIGS. 3a to 3c show exemplary drive waveforms for the prior art arrangement of FIG. 2.
Figure 3B:
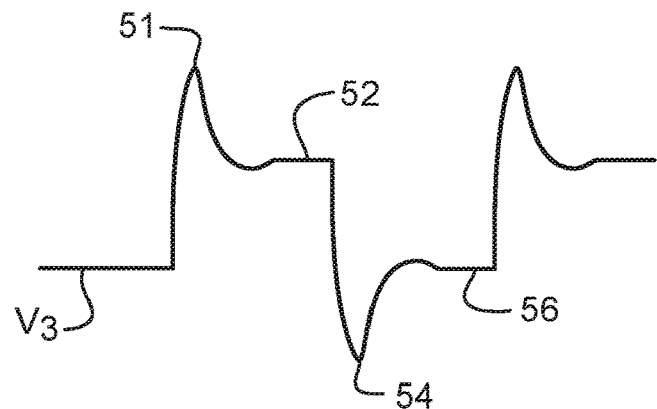
Figure 3C:
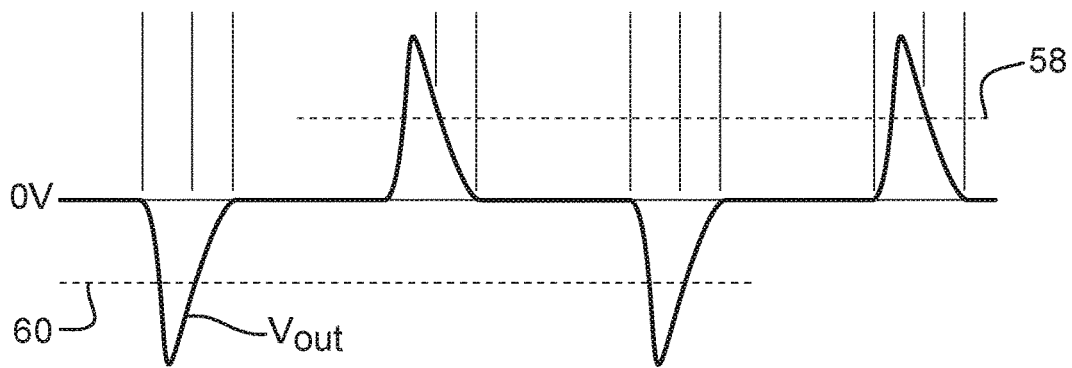

FIGS. 3a to 3c show the drive waveforms for the prior art system of FIG. 2. In FIG. 3a, exemplary drive signals $V_1$, $V_2$ are shown. Due to the separate current sources 40, 44 and current sinks 42, 46 being used to produce these drive signals $V_1$, $V_2$, they are not identical. Signal $V_1$ has a rising time $t_1$ and a falling time $t_3$, whereas signal $V_2$ has a rising time $t_2$ and a falling time $t_4$. The two signals do not have the same slew rate. This causes a mismatch in the two drive signals, such that they do not exactly mirror one another. This causes a resultant waveform $V_3$ as shown in FIG. 3b, which peaks at 51, before levelling off to 52, repeating in the opposite direction with a trough at 54 before levelling off to 56. Peak 51 is caused by the rise time $t_1$ of $V_1$ being much larger than the fall time $t_2$ of $V_2$. Similarly, trough 54 is caused by the fall time $t_3$ of $V_1$ being much smaller than rise time $t_4$ of $V_2$. Due to the transients in the waveform $V_3$ and limitations of the amplifier 23, a pickoff signal $V_{out}$ from the proof mass contains disturbances, as shown in FIG. 3c. Lines 58, 60 show the upper and lower limits of variation which are desirable for the pickoff signal $V_{out}$. Exceeding these limits can cause the pickoff input ESD protection didoes to conduct. As can be seen, due to the errors introduced by the mismatched slew rates, the pickoff signal $V_{out}$ exceeds the maximum and minimum limits 58, 60.

Figure 4:
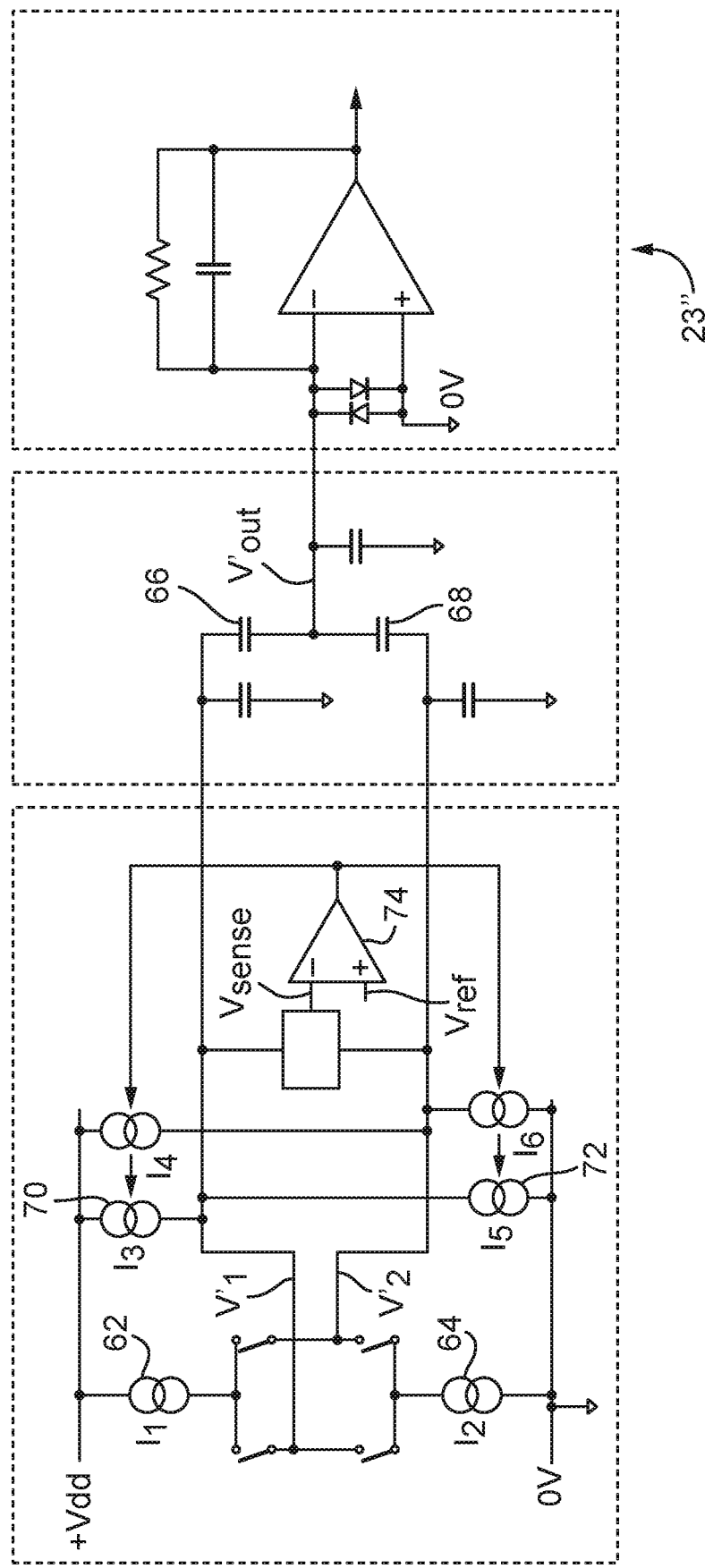
FIG. 4 shows a driving arrangement in accordance with the disclosure, for use in a closed loop system such as that of FIG. 1.

FIG. 4 shows an exemplary driving arrangement in accordance with this disclosure. A single current source 62 and current sink 64 are used to generate both the in-phase and anti-phase drive waveforms $V_1'$ and $V_2'$. The drive current may be switched back and forth between the fixed electrode fingers 110, 112. The drive waveforms $V_1'$, $V_2'$ are used to drive the capacitors 66, 68 which are formed from the electrode fingers 110, 112 and the proof mass 102. Unlike the arrangement seen in FIG. 2, the rise times of $V_1'$ and $V_2'$ for an identical load are the same as they are generated using the same current source. It also therefore follows that the fall times will be the same as they are generated using the same current sink. The drive currents can be controlled by an op-amp 74 connected to a variable current source 70 and sink 72 in parallel with the single current source 62 and sink 64. This provides a control circuit for the drive waveforms $V_1'$ and $V_2'$. The proof mass 102 output $V_{out}$ is connected to a pre-amp 23", which is referenced to the same 0V as used by the drive circuits. By referencing the pre-amp 23" at 0V, it removes the need to create a very accurate reference voltage.

In use, the fixed current source 62 and sink 64 apply the drive waveforms $V_1'$ and $V_2'$ with constant amplitude. The control circuit monitors the two drive waveforms to determine an average voltage $V_{sense}$ based on the drive waveforms $V_1'$, $V_2'$, i.e. based on an average of the positive and negative drive currents. This average voltage $V_{sense}$ is compared to a reference voltage $V_{ref}$ by the amplifier 74 to create an error signal, which is used to control the variable current source 70 and sink 72. The variable current source 70 and sink 72 adjust either or both of the source current from $I_4$ to $I_3$ and the sink current from $I_6$ to $I_5$. This adjustable current is in parallel with the fixed source and sink currents $I_2$, thereby adjusting the amplitude of the driving waveforms $V_1'$, $V_2'$ so as to alter the slew rate of the drives to match the rising slew rate with the other drive's falling slew rate (or vice versa). The variable current source 70 and sink 72 are used to alter the drive signals $V_1'$, $V_2'$ in order to ensure that they are symmetrical. By providing a majority of the drive current from the fixed current source and sink 62, 64, and then having a small proportion of the current adjusted by the variable current source and sink 70, 72, the accuracy of the drive signals is increased, improving the symmetry of the slew rates. Otherwise, when the proof mass fingers initially deflect when under an external acceleration (before the restoring force is fully applied), the non-identical capacitors 66, 68 would result in non-matching slew rates in the drive signals $V_1'$, $V_2'$. This also allows the circuit to compensate for manufacturing tolerances in both the MEMS and the ASIC electronics that would otherwise result in non-matched slew rates.

Figure 5A:
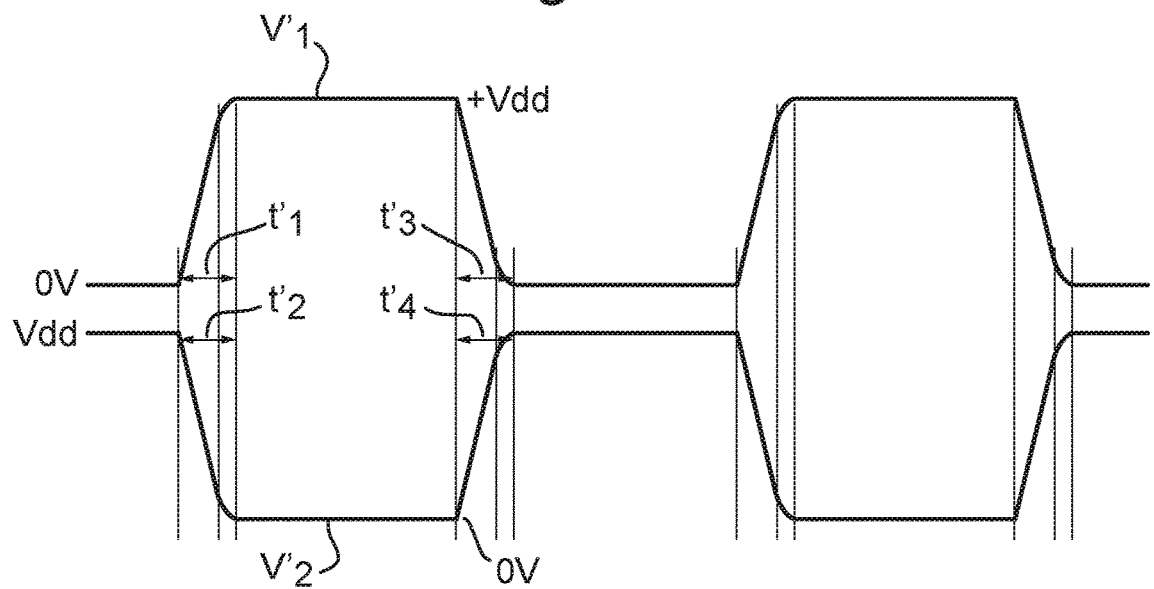
FIGS. 5a to 5c show exemplary drive waveforms for a driving system in accordance with this disclosure, such as that of FIG. 4.
Figure 5B:
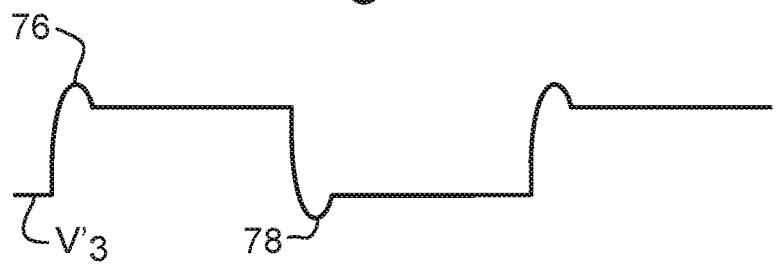
Figure 5C:
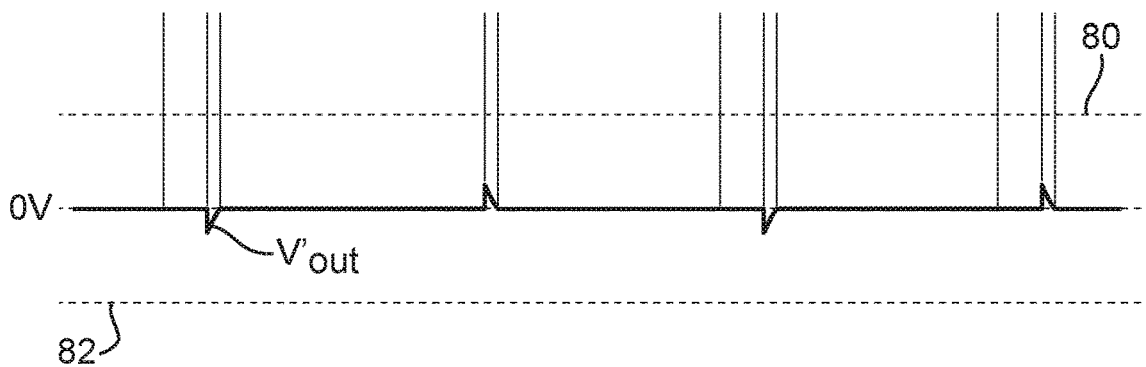

The driving arrangement of FIG. 4 produces drive signals $V_1'$, $V_2'$ as seen in FIG. 5a. As can be seen, $t_1'$ and $t_3'$ are now very similar, as are $t_2'$ and $t_4'$. As the rise and fall times for signals $V_1'$ and $V_2'$ are now much more closely matched, the slew rates are also more closely matched. This produces a resultant waveform $V_3'$ which is much smoother, seen in FIG. 5b, with peaks 76 and troughs 78 much smaller than their equivalents in FIG. 3b. The pickoff signal $V_{out}'$ generated from this system is therefore much more reliable, as can be seen from FIG. 5c. The variation in voltage is significantly smaller than the maximum and minimum limits 80, 82 of ±200 mV. By reducing the voltage disturbance in the pickoff signal $V_{out}'$, the ESD diodes seen in FIG. 4 will not conduct and hence bias accuracy is assured.

The invention claimed is:

1. A method for closed loop operation of a capacitive accelerometer, the capacitive accelerometer comprising:
a substantially planar proof mass mounted to a fixed substrate by flexible support legs so as to be linearly moveable in an in-plane sensing direction in response to an applied acceleration;
first and second sets of moveable capacitive electrode fingers extending from the proof mass, substantially perpendicular to the sensing direction and spaced apart in the sensing direction; and
first and second sets of fixed capacitive electrode fingers extending substantially perpendicular to the sensing direction and spaced apart in the sensing direction;
wherein the first set of fixed capacitive electrode fingers is arranged to interdigitate with the first set of moveable capacitive electrode fingers and the second set of fixed capacitive electrode fingers is arranged to interdigitate with the second set of moveable capacitive electrode fingers;
the method comprising:
using a single current source and a single current sink to apply an in-phase drive signal to the first set of fixed capacitive electrode fingers and a corresponding anti-phase drive signal to the second set of fixed capacitive electrode fingers so as to provide a net electrostatic restoring force on the proof mass for balancing the inertial force of the applied acceleration and maintaining the proof mass at a null position;
using a control signal to adjust at least one of the in-phase drive signal applied to the first set of fixed capacitive fingers and the anti-phase drive signal applied to the second set of fixed capacitive fingers by the single current source and the single current sink, such that a first slew rate of the drive signal applied to the first set of capacitive fingers is substantially equal to a second slew rate of the drive signal applied to the second set of capacitive fingers; and
determining an average amplitude of the in-phase and the anti-phase drive signals and comparing the average amplitude to a reference value to generate said control signal.

2. The method of claim 1, further comprising:
applying said control signal to a variable current source and sink connected in parallel with the single current source and the single current sink so as to adjust the drive signal applied to at least one of the first and second sets of fixed capacitive fingers, wherein the single current source and the single current sink are fixed.

3. The method of claim 2, wherein the variable current source and the single current sink provide a smaller current than the single fixed current source and sink.

4. The method of claim 1, further comprising: measuring a pickoff signal from the proof mass and comparing the amplitude of the pickoff signal to a reference value that is substantially zero.

5. The method of claim 1, comprising:
applying the in-phase and anti-phase drive signals as pulse width modulation (PWM) voltage waveforms.

6. A method for closed loop operation of a capacitive accelerometer, the capacitive accelerometer comprising:
a substantially planar proof mass mounted to a fixed substrate by flexible support legs so as to be linearly moveable in an in-plane sensing direction in response to an applied acceleration;
first and second sets of moveable capacitive electrode fingers extending from the proof mass, substantially perpendicular to the sensing direction and spaced apart in the sensing direction; and
first and second sets of fixed capacitive electrode fingers extending substantially perpendicular to the sensing direction and spaced apart in the sensing direction;
wherein the first set of fixed capacitive electrode fingers is arranged to interdigitate with the first set of moveable capacitive electrode fingers and the second set of fixed capacitive electrode fingers is arranged to interdigitate with the second set of moveable capacitive electrode fingers;
the method comprising:
using a single current source and a single current sink to apply an in-phase drive signal to the first set of fixed capacitive electrode fingers and a corresponding anti-phase drive signal to the second set of fixed capacitive electrode fingers so as to provide a net electrostatic restoring force on the proof mass for balancing the inertial force of the applied acceleration and maintaining the proof mass at a null position;
using a control signal to adjust the in-phase drive signal and the anti-phase drive signal applied to the first and second sets of fixed capacitive fingers respectively by the single current source and the single current sink, such that a first slew rate of the drive signal applied to the first set of capacitive fingers is substantially equal to a second slew rate of the drive signal applied to the second set of capacitive fingers; and
determining an average amplitude of the in-phase and the anti-phase drive signals and comparing the average amplitude to a reference value to generate said control signal.

7. The method of claim 6, further comprising:
applying said control signal to a variable current source and sink connected in parallel with the single current source and the single current sink so as to adjust the drive signal applied to at least one of the first and second sets of fixed capacitive fingers, wherein the single current source and the single current sink are fixed.

8. The method of claim 7, wherein the variable current source and the single current sink provide a smaller current than the single fixed current source and sink.

9. The method of claim 6, further comprising: measuring a pickoff signal from the proof mass and comparing the amplitude of the pickoff signal to a reference value that is substantially zero.

10. The method of claim 6, comprising:
applying the in-phase and anti-phase drive signals as pulse width modulation (PWM) voltage waveforms.

11. A method for closed loop operation of a capacitive accelerometer, the capacitive accelerometer comprising:
a substantially planar proof mass mounted to a fixed substrate by flexible support legs so as to be linearly moveable in an in-plane sensing direction in response to an applied acceleration;
first and second sets of moveable capacitive electrode fingers extending from the proof mass, substantially perpendicular to the sensing direction and spaced apart in the sensing direction; and
first and second sets of fixed capacitive electrode fingers extending substantially perpendicular to the sensing direction and spaced apart in the sensing direction;
wherein the first set of fixed capacitive electrode fingers is arranged to interdigitate with the first set of moveable capacitive electrode fingers and the second set of fixed capacitive electrode fingers is arranged to interdigitate with the second set of moveable capacitive electrode fingers;

the method comprising:
using a single current source and a single current sink to apply an in-phase drive signal to the first set of fixed capacitive electrode fingers and a corresponding anti-phase drive signal to the second set of fixed capacitive electrode fingers so as to provide a net electrostatic restoring force on the proof mass for balancing the inertial force of the applied acceleration and maintaining the proof mass at a null position;

using a control signal to adjust at least one of the in-phase drive signal applied to the first set of fixed capacitive fingers and the anti-phase drive signal applied to the second set of fixed capacitive fingers by the single current source and the single current sink, such that a first slew rate of the drive signal applied to the first set of capacitive fingers is substantially equal to a second slew rate of the drive signal applied to the second set of capacitive fingers; and applying said control signal to a variable current source and sink connected in parallel with the single current source and the single current sink so as to adjust the drive signal applied to at least one of the first and second sets of fixed capacitive fingers, wherein the single current source and single current sink are fixed.

12. The method of claim 11, wherein the variable current source and the single current sink provide a smaller current than the fixed single fixed current source and the fixed single fixed current sink.

13. A method for closed loop operation of a capacitive accelerometer, the capacitive accelerometer comprising:
a substantially planar proof mass mounted to a fixed substrate by flexible support legs so as to be linearly moveable in an in-plane sensing direction in response to an applied acceleration;
first and second sets of moveable capacitive electrode fingers extending from the proof mass, substantially perpendicular to the sensing direction and spaced apart in the sensing direction; and
first and second sets of fixed capacitive electrode fingers extending substantially perpendicular to the sensing direction and spaced apart in the sensing direction;
wherein the first set of fixed capacitive electrode fingers is arranged to interdigitate with the first set of moveable capacitive electrode fingers and the second set of fixed capacitive electrode fingers is arranged to interdigitate with the second set of moveable capacitive electrode fingers;

the method comprising:
using a single current source and a single current sink to apply an in-phase drive signal to the first set of fixed capacitive electrode fingers and a corresponding anti-phase drive signal to the second set of fixed capacitive electrode fingers so as to provide a net electrostatic restoring force on the proof mass for balancing the inertial force of the applied acceleration and maintaining the proof mass at a null position;

using a control signal to adjust the in-phase drive signal and the anti-phase drive signal applied to the first and second sets of fixed capacitive fingers respectively by the single current source and the single current sink, such that a first slew rate of the drive signal applied to the first set of capacitive fingers is substantially equal to a second slew rate of the drive signal applied to the second set of capacitive fingers; and applying said control signal to a variable current source and sink connected in parallel with the single current source and the single current sink so as to adjust the drive signal applied to at least one of the first and second sets of fixed capacitive fingers, wherein the single current source and the single current sink are fixed.

14. The method of claim 13, wherein the variable current source and the single current sink provide a smaller current than the fixed single fixed current source and the fixed single fixed current sink.

15. A capacitive accelerometer comprising:
a substantially planar proof mass mounted to a fixed substrate by flexible support legs so as to be linearly moveable in an in-plane sensing direction in response to an applied acceleration;
first and second sets of moveable capacitive electrode fingers extending from the proof mass, substantially perpendicular to the sensing direction and spaced apart in the sensing direction;
first and second sets of fixed capacitive electrode fingers extending substantially perpendicular to the sensing direction and spaced apart in the sensing direction;
wherein the first set of fixed capacitive electrode fingers is arranged to interdigitate with the first set of moveable capacitive electrode fingers and the second set of fixed capacitive electrode fingers is arranged to interdigitate with the second set of moveable capacitive electrode fingers;
a drive signal generator arranged to apply an in-phase drive signal to the first set of fixed capacitive electrode fingers and a corresponding anti-phase drive signal to the second set of fixed capacitive electrode fingers so as to provide a net electrostatic restoring force on the proof mass for balancing the inertial force of the applied acceleration and maintaining the proof mass at a null position;
a single current source and a single current sink connected to the drive signal generator to generate both the in-phase and the anti-phase drive signals; and
a control circuit arranged to adjust at least one of the in-phase drive signal applied to the first set of fixed capacitive fingers and the anti-phase drive signal applied to the second set of fixed capacitive fingers by the single current source and the single current sink, such that a first slew rate of the drive signal applied to the first set of capacitive fingers is substantially equal to a second slew rate of the drive signal applied to the second set of capacitive fingers;
wherein said control circuit is arranged to determine an average amplitude of the in-phase and the anti-phase drive signals and compare the average amplitude to a reference value.

16. A capacitive accelerometer comprising:
a substantially planar proof mass mounted to a fixed substrate by flexible support legs so as to be linearly moveable in an in-plane sensing direction in response to an applied acceleration;

first and second sets of moveable capacitive electrode fingers extending from the proof mass, substantially perpendicular to the sensing direction and spaced apart in the sensing direction;

first and second sets of fixed capacitive electrode fingers extending substantially perpendicular to the sensing direction and spaced apart in the sensing direction;

wherein the first set of fixed capacitive electrode fingers is arranged to interdigitate with the first set of moveable capacitive electrode fingers and the second set of fixed capacitive electrode fingers is arranged to interdigitate with the second set of moveable capacitive electrode fingers;

a drive signal generator arranged to apply an in-phase drive signal to the first set of fixed capacitive electrode fingers and a corresponding anti-phase drive signal to the second set of fixed capacitive electrode fingers so as to provide a net electrostatic restoring force on the proof mass for balancing the inertial force of the applied acceleration and maintaining the proof mass at a null position;

a single current source and a single current sink connected to the drive signal generator to generate both the in-phase and the anti-phase drive signals; and a control circuit arranged to adjust the in-phase drive signal and the anti-phase drive signal applied to the first and second sets of fixed capacitive fingers respectively by the single current source and the single current sink, such that a first slew rate of the drive signal applied to the first set of capacitive fingers is substantially equal to a second slew rate of the drive signal applied to the second set of capacitive fingers;

wherein said control circuit is arranged to determine an average amplitude of the in-phase and the anti-phase drive signals and compare the average amplitude to a reference value.

17. A capacitive accelerometer comprising:

a substantially planar proof mass mounted to a fixed substrate by flexible support legs so as to be linearly moveable in an in-plane sensing direction in response to an applied acceleration;

first and second sets of moveable capacitive electrode fingers extending from the proof mass, substantially perpendicular to the sensing direction and spaced apart in the sensing direction;

first and second sets of fixed capacitive electrode fingers extending substantially perpendicular to the sensing direction and spaced apart in the sensing direction;

wherein the first set of fixed capacitive electrode fingers is arranged to interdigitate with the first set of moveable capacitive electrode fingers and the second set of fixed capacitive electrode fingers is arranged to interdigitate with the second set of moveable capacitive electrode fingers;

a drive signal generator arranged to apply an in-phase drive signal to the first set of fixed capacitive electrode fingers and a corresponding anti-phase drive signal to the second set of fixed capacitive electrode fingers so as to provide a net electrostatic restoring force on the proof mass for balancing the inertial force of the applied acceleration and maintaining the proof mass at a null position;

a single current source and a single current sink connected to the drive signal generator to generate both the in-phase and anti-phase drive signals; and a control circuit arranged to adjust at least one of the in-phase drive signal applied to the first set of fixed capacitive fingers and the anti-phase drive signal applied to the second set of fixed capacitive fingers by the single current source and the single current sink, such that a first slew rate of the drive signal applied to the first set of capacitive fingers is substantially equal to a second slew rate of the drive signal applied to the second set of capacitive fingers;

wherein said control circuit comprises a variable current source and sink connected in parallel with the single current source and the single current sink, wherein the single current source and single current sink are fixed.

18. The capacitive accelerometer of claim 17, wherein the variable current source and sink provide a smaller current than the single fixed current source and single fixed current sink.

19. A capacitive accelerometer comprising:

a substantially planar proof mass mounted to a fixed substrate by flexible support legs so as to be linearly moveable in an in-plane sensing direction in response to an applied acceleration;

first and second sets of moveable capacitive electrode fingers extending from the proof mass, substantially perpendicular to the sensing direction and spaced apart in the sensing direction;

first and second sets of fixed capacitive electrode fingers extending substantially perpendicular to the sensing direction and spaced apart in the sensing direction;

wherein the first set of fixed capacitive electrode fingers is arranged to interdigitate with the first set of moveable capacitive electrode fingers and the second set of fixed capacitive electrode fingers is arranged to interdigitate with the second set of moveable capacitive electrode fingers;

a drive signal generator arranged to apply an in-phase drive signal to the first set of fixed capacitive electrode fingers and a corresponding anti-phase drive signal to the second set of fixed capacitive electrode fingers so as to provide a net electrostatic restoring force on the proof mass for balancing the inertial force of the applied acceleration and maintaining the proof mass at a null position;

a single current source and a single current sink connected to the drive signal generator to generate both the in-phase and anti-phase drive signals; and a control circuit arranged to adjust the in-phase drive signal and the anti-phase drive signal applied to the first and second sets of fixed capacitive fingers respectively by the single current source and the single current sink, such that a first slew rate of the drive signal applied to the first set of capacitive fingers is substantially equal to a second slew rate of the drive signal applied to the second set of capacitive fingers;

wherein said control circuit comprises a variable current source and sink connected in parallel with the single current source and the single current sink, wherein the single current source and single current sink are fixed.

20. The capacitive accelerometer of claim 19, wherein the variable current source and sink provide a smaller current than the single fixed current source and single fixed current sink.

* * * * *